United States Patent
Breindahl et al.

(10) Patent No.: US 10,123,572 B2
(45) Date of Patent: Nov. 13, 2018

(54) THERMAL SHIELD FOR A NEWBORN INFANT

(75) Inventors: Morten Breindahl, Kgs. Lyngby (DK); Berit B. Weisenfeld, Copenhagen Nv (DK)

(73) Assignees: Morten Breindahl Holding ApS, Lyngby (DK); BBW Design ApS, Copenhagen NV (DK)

( * ) Notice: Subject to any disclaimer, the term of this patent is extended or adjusted under 35 U.S.C. 154(b) by 1247 days.

(21) Appl. No.: 13/643,628

(22) PCT Filed: Apr. 28, 2011

(86) PCT No.: PCT/DK2011/050138
§ 371 (c)(1),
(2), (4) Date: Oct. 26, 2012

(87) PCT Pub. No.: WO2011/134475
PCT Pub. Date: Nov. 3, 2011

(65) Prior Publication Data
US 2013/0036536 A1 Feb. 14, 2013

(30) Foreign Application Priority Data

Apr. 29, 2010 (EP) .................................... 10161426
Mar. 7, 2011 (DK) ................................. 2011 70111

(51) Int. Cl.
*A41B 13/06* (2006.01)
*A41D 13/12* (2006.01)
*G01K 13/00* (2006.01)

(52) U.S. Cl.
CPC .......... *A41B 13/06* (2013.01); *A41D 13/1272* (2013.01); *G01K 13/00* (2013.01);
(Continued)

(58) Field of Classification Search
CPC combination set(s) only.
See application file for complete search history.

(56) References Cited

U.S. PATENT DOCUMENTS 3,636,566 A * 1/1972 Sutherland ............. A41B 13/06
2/69.5
3,739,399 A * 6/1973 Sheahon ................ A41B 13/06
2/69.5

(Continued)

FOREIGN PATENT DOCUMENTS

DE 19514387 A1 10/1996
WO WO-2007141490 A1 12/2007

*Primary Examiner* — Joseph Stoklosa
*Assistant Examiner* — Adam Avigan
(74) *Attorney, Agent, or Firm* — Locke Lord LLP; Nicholas J. DiCeglie, Jr.

(57) ABSTRACT

The present invention relates to a thermal shield 1 for at least partly surrounding a newborn infant by the shield 1 to protect it from undesired cooling or heating. The shield 1 comprises a first layer 3 and a second layer 4 both of a transparent material, which layers 3,4 are joined so that there is at least one air containing pocket 5 between the layers 3,4. When the thermal shield 1 is in use, the mutual arrangement of the first and second layers 3,4 allows the at least one pocket to be deformable to an amount necessary for establishment of acoustic contact between the skin of the infant 10 and an acoustic transducer 11 placed on an outer surface of the second layer 4. In some embodiments of the thermal shield, the at least one air containing pocket 5 is air tight, and acoustic contact can be established over an area of at least 1 cm². In other embodiments, there is at least one open passage 13 from the surroundings and into each of the at least one air pocket 5 between the first and second layers 3,4, and the compliance of the first layer 3 is higher than the compliance of the second layer 4 so that when an infant is placed in the shield 1, the first layer 3 clings around the (Continued)

infant while the second layer 4 deforms to a lesser extent than the first layer 3 so that air from the surroundings flows into the at least one air pocket 5 via the open passage 13.

12 Claims, 5 Drawing Sheets

(52) U.S. Cl.
CPC ...... *A41B 2400/52* (2013.01); *A41D 2400/10* (2013.01); *A41D 2400/422* (2013.01); *G01K 2217/00* (2013.01)

(56) References Cited

U.S. PATENT DOCUMENTS

| | | | |
|---|---|---|---|
| 4,083,064 A * | 4/1978 | Schneider | A41B 13/00 2/69.5 |
| 5,722,094 A * | 3/1998 | Ruefer | A41B 13/06 2/69 |
| 6,228,106 B1 | 5/2001 | Simbruner et al. | |
| 7,530,942 B1 * | 5/2009 | Diab | A61G 11/00 600/22 |
| 2002/0124295 A1 * | 9/2002 | Fenwick | A41D 13/1245 2/69 |
| 2011/0083276 A1 * | 4/2011 | Pieta | A41B 13/06 5/655 |

* cited by examiner

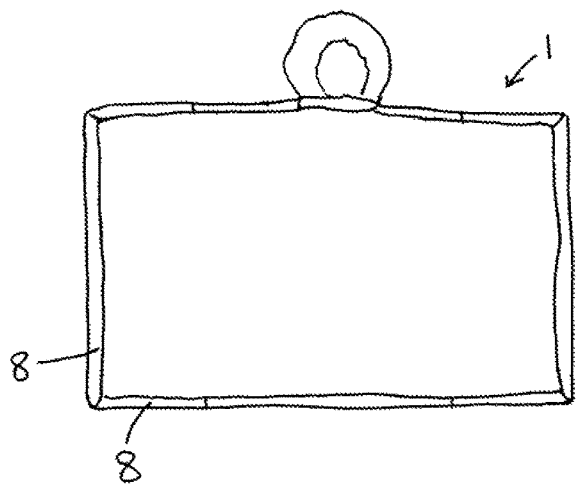
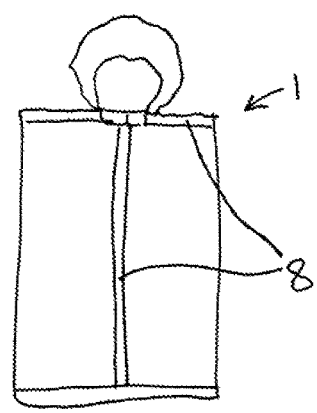
Fig. 3a   Fig. 3b
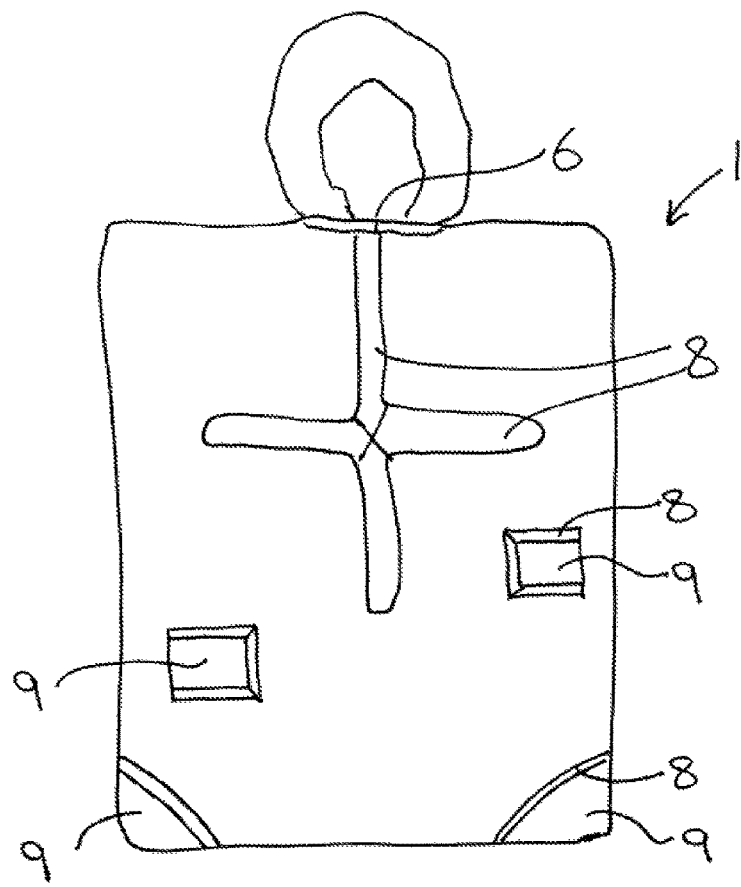
Fig. 4

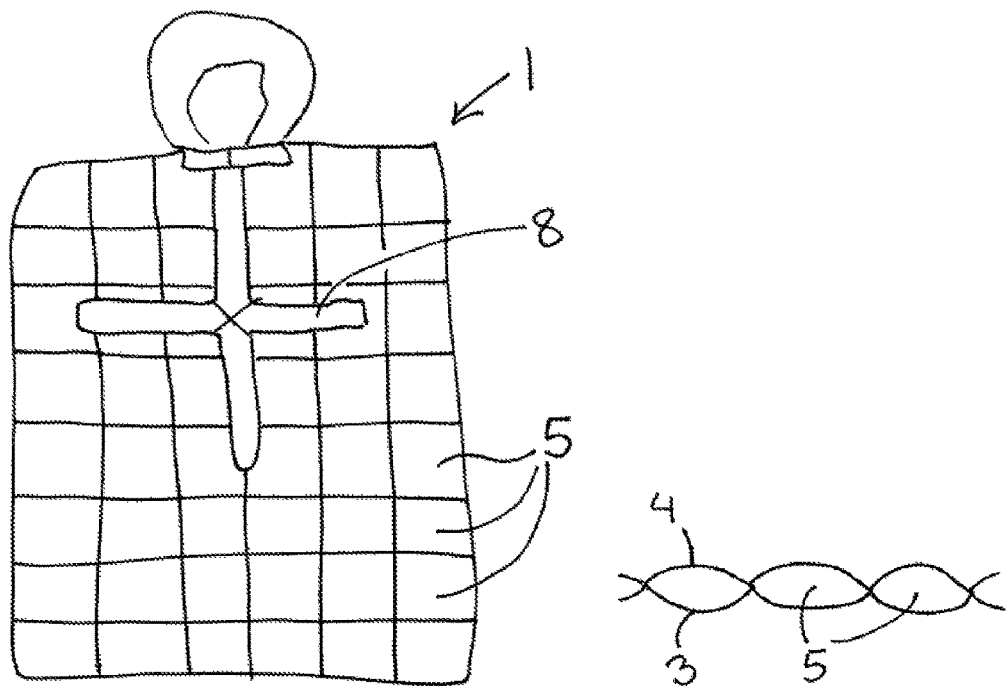
Fig. 5a                    Fig. 5b
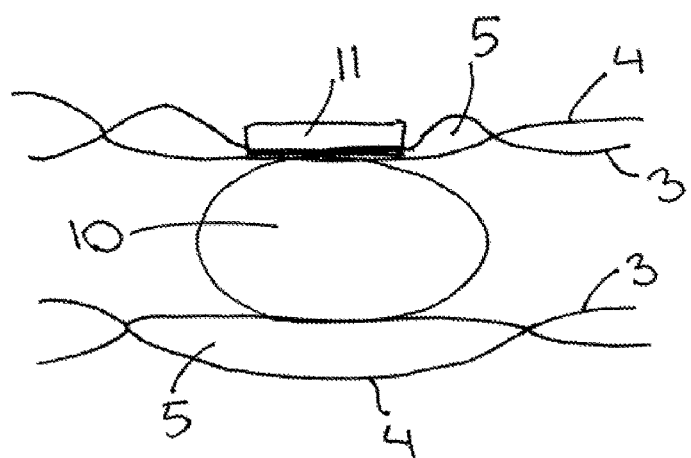
Fig. 6

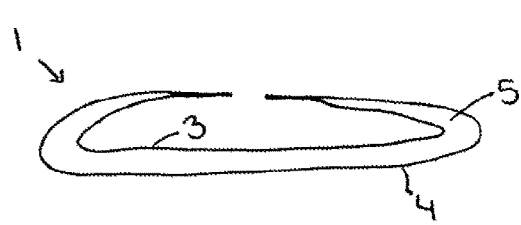
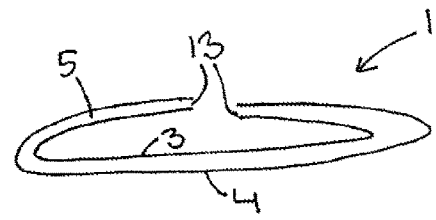
Fig. 7a  Fig. 7b
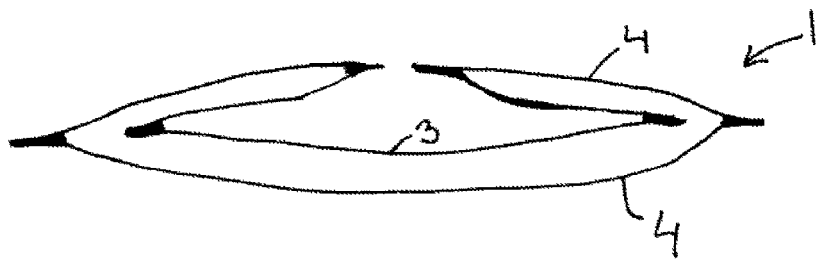
Fig. 8
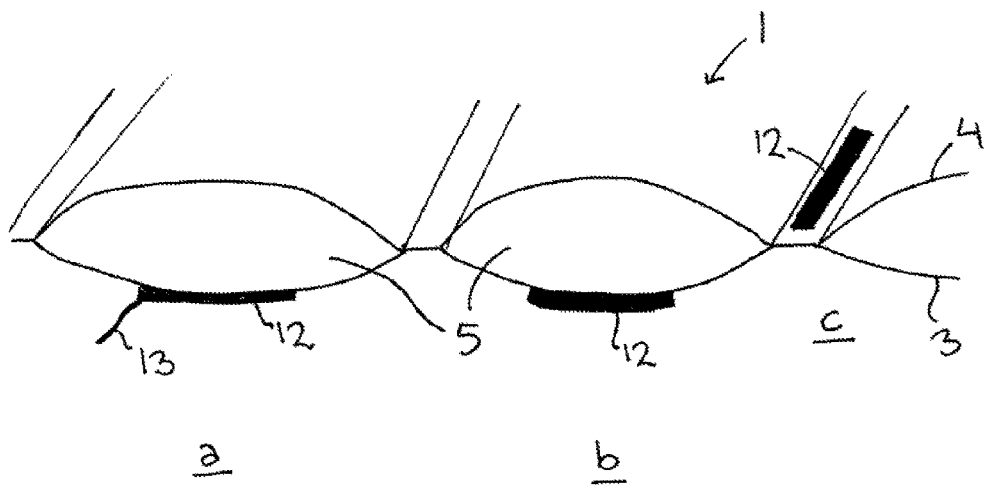
Fig. 9

THERMAL SHIELD FOR A NEWBORN INFANT

CROSS-REFERENCE TO RELATED APPLICATIONS

This application is the national phase under 35 U.S.C. § 371 of PCT International Application No. PCT/DK2011/050138, filed Apr. 28, 2011, which claims the benefit of European Patent Application No. 10161426.1, filed Apr. 29, 2010, and Danish Patent Application No. PA 2011 70111, filed Mar. 7, 2011, the entire contents of the aforementioned applications are hereby incorporated herein by reference.

FIELD OF THE INVENTION

The present invention relates to a thermal shield for a newborn infant, and in particular to a thermal shield that allows for acoustic measurements of the infant's condition to be performed without the need to remove the shield from the infant.

BACKGROUND OF THE INVENTION

Hypo- and hyperthermia in newborn and specifically preterm and very-low-birth-weight (VLBW) infants may develop extremely fast and cause severe respiratory, circulatory and metabolic disturbances. Both conditions are—if left untreated—associated with an increased mortality and morbidity. Different means are therefore used to keep a newborn infant at the right temperature until such time that his/her thermoregulatory mechanism gains stability. This is particularly important if the infant has to be transported to hospital, e.g. after being born at home or in an ambulance, or if it is being transferred between different hospitals, departments and/or neonatal units.

It has been demonstrated that keeping premature infants warm immediately after birth may significantly reduce mortality during the early postnatal period. Furthermore, hypothermia in the VLBW, severely premature and critically ill neonates may cause hypoglycaemia as well as an increase in insensible water loss leading to an imbalanced fluid homeostasis. The resulting electrolyte disturbances necessitate vigilant monitoring of all circulatory, respiratory and gastrointestinal parameters in a neonatal intensive care unit.

Hyperthermia, on the other hand, is also associated with increased neonatal mortality and presents similar serious problems to the infant as may be caused by hypothermia. Consequently, the body temperature should preferably be kept in the range of 36.0-37.5° C., since core temperatures outside this range significantly increase mortality and morbidity.

To protect newborn infants from the cooling effect caused by convection, conduction, evaporation and radiation, they are typically wrapped in blankets, bubble wrap or even disposable plastic waste bags as that is often what is available. However, there exists no unique modus operandi or certified product for wrapping the infants and thereby maintaining stable body temperatures. Another problem with such wrapping is that it is often not transparent, so that visual observation of the infant is impaired. It is therefore necessary to un-wrap the infant in order to be able to assess the health conditions, such as skin colour, pulse rate or respiration, thereby exposing the infant to the cooler environment.

Some births take place in acute and non-clinical settings or under surveillance of less experienced personnel, and there is consequently a demand from personnel facing the challenges of handling births for a thermal stabilisation shield which is well designed and easy-to-use, easy-to-carry and taking up only little space so as to be packed in portable rescue units or in another way portable manner.

Hence, an improved thermal shield for newborn infants would be advantageous, and in particular a more efficient and/or reliable thermal shield would be advantageous.

OBJECT OF THE INVENTION

It is an object of the present invention to provide a thermal shield for a newborn infant which allows for acoustical assessment of the infant's condition without opening the shield.

It is another object of the present invention to provide a thermal shield which is easy to use.

It is an object of embodiments of the present invention to provide a thermal shield which can be packed to a compact size for storage before use; i.e. without taking up much space. Such storage can e.g. be in a coat pocket or in a portable rescue unit.

It is an object of embodiments of the present invention to provide a thermal shield having easy portability e.g. in a coat pocket before use.

It is an object of embodiments of the present invention to provide a thermal shield which can be packed to a compact size for storage before use and still quickly opens to a ready-to-use condition capable of providing thermal shielding within a few seconds.

It is an object of embodiments of the present invention to provide a thermal shield which allows for constant monitoring of whether the temperature inside the shield is within preset limits.

It is another object of embodiments of the present invention to provide a thermal shield having opening and locking features for easy access to the infant with only minimal exposure to the surrounding environment.

It is another object of embodiments of the present invention to provide a thermal shield allowing easy access to central organ systems, such as airways, cardiovascular, gastrointestinal, urogenital systems etc., for monitoring, manipulation, treatment and insertion/attachment of tubes, cannulae, lines, catheters, and electrodes according to the clinical condition of the infant.

It is a further object of the present invention to provide an alternative to the prior art.

SUMMARY OF THE INVENTION

Thus, the above described object and several other objects are intended to be obtained in a first aspect of the invention by providing a thermal shield for at least partly surrounding a newborn infant by the shield, wherein:
  the shield comprises a first layer and a second layer both of a transparent material, which layers are joined so that there is at least one air containing pocket between the layers, and
  the mutual arrangement of the first and second layer allows, when the thermal shield is in use, the at least one pocket to be deformable to an amount necessary for establishment of acoustic contact between the infant's skin and an acoustic transducer placed on an outer surface of the thermal shield
in which thermal shield:

the at least one air containing pocket is air tight, and acoustic contact can be established over an area of at least 1 cm², or there is at least one open passage from the surroundings and into each of the at least one air pocket between the first and second layers, and the compliance of the first layer is higher than the compliance of the second layer so that when an infant is placed in the shield, the first layer clings around the infant while the second layer deforms to a lesser extent than the first layer so that air from the surroundings flows into the at least one pocket via the open passage.

The use of "newborn" is not meant to limit the use of the thermal shield to an infant that has just been born. It can also be used for infants in the weeks following the birth, e.g. during handling, such as transportation, under circumstances where thermal insulation is advantageous. On the other hand, the thermal shield should not be unnecessarily large to ensure compact storage before use and easy and safe handling when in use.

The thermal shield is made from transparent material to enable visual observation of the infant without the need to open the shield. However, even though it is specified that the first and second layers are made from transparent material, it does not exclude embodiments where one or more parts of one or both of the shields are made from non-transparent material as long as the desired visual observation of the infant is ensured.

By "compliance" is preferably meant the ability of the material to deform in response to forces applied thereon. In the present case, such forces are e.g. the sticking force from wet surface of the newborn infant due to amniotic fluid or other moisture on the infant. There is also influence from the air pressure immediately surrounding the actual layer. The differences in compliance can e.g. be obtained by the layers being made from the same material but having different thicknesses. It can alternatively be obtained by the layers having the same thickness but different elastic properties.

An advantage of the option with the at least one air tight pockets is that the amount of air in the pocket can be controlled already during the manufacturing of the thermal shield. It can e.g. be ensured that there is also air between the infant and the surface onto which it is being placed, even during use of the thermal shield.

An advantage of the option with at least one open passage into each of the at least one pocket is that the thermal shield can be packed and stored in a compact way until use. It can preferably be packed to a pocket-size shape so that it can be carried by midwifes, nurses and doctors ready for use without delay when necessary. It can also be stored in ambulances ready for protection of infants being born on the way to hospital.

The possibility of establishing acoustic contact between the infant's skin and an acoustic transducer through the thermal shield means that it is possible to assess or monitor the conditions of the infant without opening the shield. Such a transducer could e.g. be the head of a stethoscope or the cuff of a blood pressure measuring apparatus. Hereby the infant is kept fully protected from thermal influence from the surroundings by the thermal shield even during examination. At least some embodiments of the invention may also enable performance of ultrasound measurements through the shield. Such ultrasound measurements may require use of particularly suitable materials and/or thicknesses of the first and second layers.

Each layer may be made from one or from more sheets of material. This will be explained in further details in relation to the figures.

The thermal shield may further comprise a first opening for the infant's head, and a second opening with closing means adapted to vary the size of the second opening so that the second opening has a size which allows the infant to be placed in a cavity partly surrounded by the shield when the closing means are in an open condition, and so that the shield surrounds most of the infant when the closing means are in a closed condition.

Preferably the first opening has a size so that the face of the infant is not covered to prevent suffocation and allowing respiratory support. The first opening may be in the form of a hood and may be provided with an elastic band along the edges to minimise the risk of suffocation. Alternatively or in combination therewith, the first opening may be provided with one or more strings adapted to adjust the size of the first opening. Furthermore the size of a hood itself may be adjustable by use of built-in strings.

If desired, assessment may additionally or alternatively be performed via the second opening which can be fully or partly opened to provide better access to the infant. Hereby the assessment can be done without a need to move the infant and while the infant is still partly protected by the shield. In this way the conditions for the infant can be kept as stable as possible by only opening the second opening as much as necessary.

The first and second layers may be joined by any suitable process which will be well-known to a person skilled in the art, such as by thermo welding.

The acoustic contact can preferably be established over an area of at least 1 cm² for any thermal shield according to the present invention. Hereby is preferably meant an area of substantially the same size in two dimensions. This allows for use of equipment such as stethoscopes and cuffs of blood pressure measuring devices. The area is preferably large enough for establishment of acoustic contact with an image forming transducer.

When the first layer of the thermal shield clings around the infant placed in the shield, it may be obtained that the air current past the infant is limited, so that the cooling is minimised.

The second layer is preferably made so that it allows safe handling, such as moving, of the infant without any significant risk of puncturing the pockets. The layers are preferably made from a plastic material, such as from Polyethylene. This is typically a material of solid monolithic non-cellular cross-section which is adapted to permit audio detection of body functions there through. The choice of material must take into account that the thermal shield is preferably delivered sterilised or at least as a clean product, and the actual sterilisation method used should therefore not influence the properties of the material in an undesired way. The material may also be chosen to be impermeable to water vapour at least from the inside to the outside, in order to reduce fluid loss via the skin to a large extent. Appropriate mechanical and thermal properties of the materials used for the first and second layers can be ensured by standard test procedures which will be well-known to a person skilled in the art.

In preferred embodiments of the invention, the thermal shield further comprises one or more further openings through which physical interaction with the infant is possible. These further openings are preferably fully closable so that the thermal influence on the infant from the surroundings is minimised when the openings are not in use. Such openings may e.g. be used for constantly or intermittently measuring vital signs or parameters of the infant, such as the temperature, the lung functioning, or the pulse.

A thermal shield according to the invention may comprise a plurality of air containing pockets between the first and second layers. Hereby a more evenly distribution of the thermally insulating air around the infant can be ensured. Furthermore, accidental puncture of one air pocket will not render the shield useless.

Some embodiments of the invention further comprise a non-invasive temperature monitoring device for monitoring the temperature inside the shield. Such a device may e.g. be a build-in thermal strip of temperature sensitive material. The temperature monitoring device may preferably be arranged inside the first layer, such as on an inner surface of the first layer, as this is believed to give the most correct monitoring. Alternatively it may be arranged between the first and second layer, such as in an area where the two layers are joined. Hereby the temperature monitoring device can be protected by the layers without any significant error in the measurements. If considered necessary for some materials used for the layers, the temperature monitoring device may be calibrated to take into account possible temperature differences between the first space where the infant is placed and the surroundings. The temperature monitoring device may alternatively be arranged so that it can be directly attached to the infant's skin.

In embodiments comprising a non-invasive temperature monitoring device, the temperature monitoring device may have alarm limits; these alarm limits are preferably but not necessarily preset. Hereby it will be easy for people handling and surveying the infant to be warned as soon as the temperature becomes critical.

Such a temperature monitoring device may have a visual colour indicator adapted to indicate if the temperature is below or above the preset alarm limits. The indicator may e.g. turn blue if the temperature is below 36.0° C. and turn red if the temperature is above 37.5° C. A graduation of the scale is also possible for more precise monitoring of the temperature, if desired or considered necessary. The thermal shield may comprise more than one of such temperature monitoring devices arranged at different locations with respect to the contours of the shield.

A thermal shield as described above may further comprise a transcutaneous saturation monitor which monitors the percentage of oxygen in the blood stream of the infant through the skin.

A thermal shield according to the present invention may further comprise additional insulation means arranged so that they are located between the infant and a support, such as a table, on which the infant is placed when the thermal shield is in use. Such an additional insulation means may be fastened to or incorporated into the thermal shield. Alternatively, it may be adapted to be arranged in the desired position just before use of the thermal shield or when the infant has been placed in the shield. This will be illustrated in the figures.

The insulation means may comprise a cushion made from a polymer foam. By using a foam material it is obtained that the thermal shield can be packed to a compact condition, such as to a pocket-shape size, even with the cushion comprised therein and ready for use. Such a cushion may have a shape that assists in positioning of the infant.

Alternatively or in combination therewith, the insulation means may comprise one or more air containing pockets. They may e.g. be arranged so that when the shield is in use, they stabilize the infant laterally along the infant's body. If desired, it may also be possible to arrange other insulating means inside the thermal shield. Such insulation means could e.g. be a small bag or cushion containing insulating gel.

In preferred embodiments of the invention, the first layer forms an inner bag adapted to receive the infant inside it, and the second layer forms an outer bag that at least partly surrounds the inner bag. Such an outer bag may be larger than the inner bag. Hereby the amount of insulating air can be larger than if the two bags are of substantially the same size.

The present invention also relates to the use of a thermal shield in any of the embodiments described above for protecting a newborn infant against undesired heating or cooling.

BRIEF DESCRIPTION OF THE FIGURES

The thermal shield according to the invention will now be described in more detail with regard to the accompanying figures. The figures show one way of implementing the present invention and is not to be construed as being limiting to other possible embodiments falling within the scope of the attached claim set.

FIG. 3 shows schematically an alternative embodiment of the invention in which the thermal shield can be opened to a blanket- or sheet-like configuration. FIG. 3a shows the shield in a fully opened condition, and FIG. 3b shows the shield in a fully closed condition.

FIG. 4 shows schematically a thermal shield having a number of further openings which allow interaction with the infant without the need to open the second opening.

FIG. 5 shows schematically a thermal shield in which the space between the first and second layers is divided into a plurality of air containing pockets. FIG. 5a shows the whole shield, and FIG. 5b shows a cross section of the air pockets formed by the first and second layers.

FIG. 6 shows schematically how the air pockets can be deformed to allow for establishment of acoustic contact between the infant's skin and an acoustic transducer placed on an outer surface of the thermal shield.

FIG. 7 shows schematically an embodiment of the invention where there are open passages from the surroundings and into an air pocket between the first and second layers. FIG. 7.a and FIG. 7.b are cross sectional views along lines A and B, respectively, in FIG. 2.

FIG. 8 shows schematically an example of the embodiment in FIG. 7.a, wherein each layer is made from two or more sheets of material each.

FIG. 9 shows schematically three possible arrangements of a temperature monitoring device.

FIG. 10 shows schematically two embodiments of the invention comprising additional insulation means in the form of a cushion. The figure shows two cross sectional views corresponding to the cross sectional view in FIG. 7.a.

DETAILED DESCRIPTION OF AN EMBODIMENT

Figure 1:
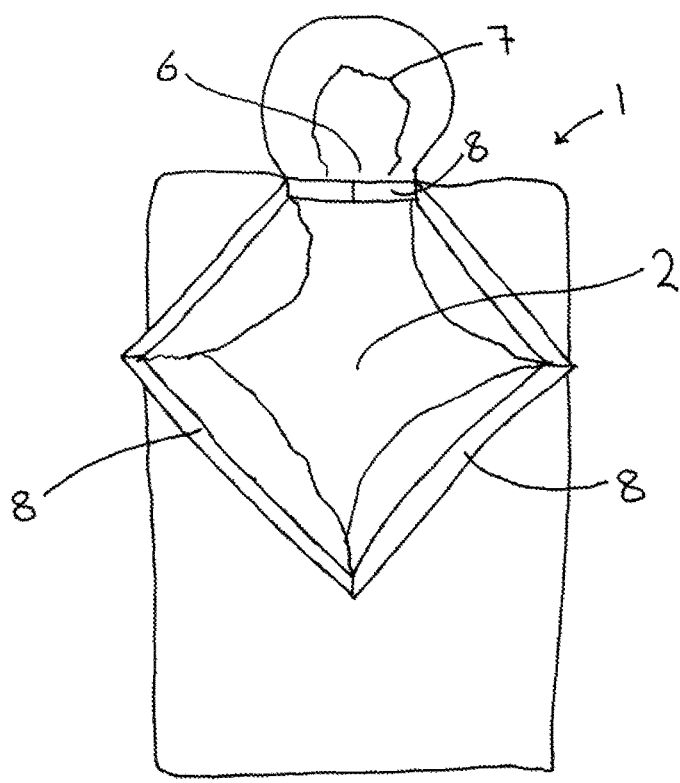
FIG. 1 shows schematically an example of a thermal shield according to the invention with the second opening in a fully open condition.
Figure 2:
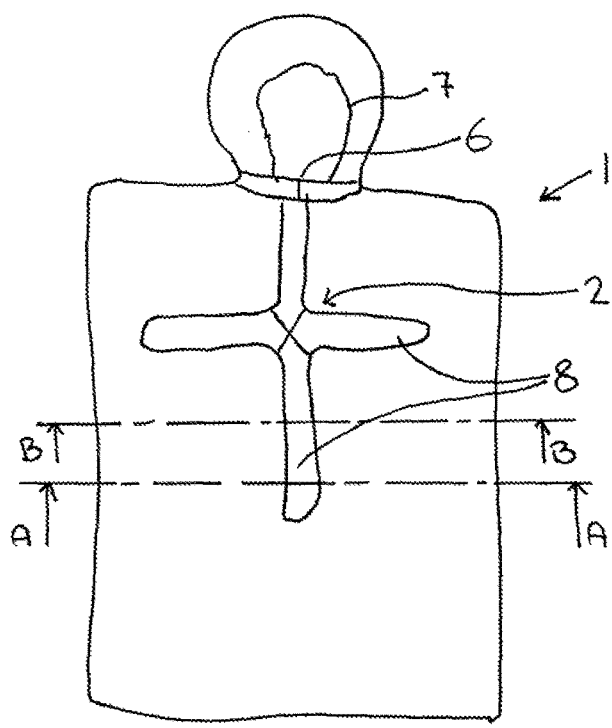
FIG. 2 shows schematically the thermal shield of FIG. 1 with the opening in a fully closed condition.

FIG. 1 shows schematically an example of a thermal shield 1 with the second opening 2 in a fully open condition, and FIG. 2 shows schematically the thermal shield 1 of FIG.

1 with the second opening 2 in a fully closed condition. The shapes, and sizes of the second opening may differ from the ones shown in the figures. It may e.g. be a round or square opening covered by a flap. The intended use of the thermal shield 1 is for a newborn infant (not shown), especially preterm and very-low-birth-weight (VLBW) infants due to their increased mortality and morbidity caused by thermal influences from the environment especially during the first hours after birth. The shield 1 can also be used for infants born by caesarean section to keep them warm in the first critical minutes after birth, if considered necessary.

The shield 1 comprises a first layer 3 and a second layer 4 (see FIGS. 5 and 6) both of transparent material to enable visual observation of the infant. When the shield 1 is in use, the first layer 3 will be the layer closest to the child, and the second layer 4 will form the outer surface of the shield. The layers 3,4 are joined so that there is at least one air containing pocket 5 (see FIG. 6) between the layers 3,4 to provide thermal insulation. The shield 1 has a first opening 6 for the infant's head, which opening 6 typically but not necessarily is in the form of a hood to protect the infant's head from heat loss. Alternatively the shield 1 has no hood, and if necessary a hood may be provided separately. The first opening 6, such as the hood, may be provided with an elastic band 7 along the edge to obtain a relatively close fit. Hereby the air exchange with the surroundings is kept low, and the risk of suffocation is minimised. The hood may also be provided with one or more strings to be used for adjusting the size of the hood.

The second opening 2 is provided with closing means 8 adapted to vary the size of the second opening 2. The second opening 2 has a size which allows the infant to be placed in a cavity partly surrounded by the shield 1 when the closing means 8 are in an open condition, and so that the shield 1 surrounds most of the infant when the closing means 8 are in a closed condition. Later, assessment of the infant can be done via this second opening 2 without a need to move the infant and while the infant is still partly protected by the shield 1. In this way the conditions for the infant can be kept as stable as possible by only opening the second opening 2 as much as necessary. Since examination of the infant will typically include inspection, auscultation and palpation of the skin, chest (including heart and lungs) and abdomen, the second opening 2 is typically arranged so that it covers this part of the infant. Depending on the actual need, the second opening 2 can be fully or partly opened. The shield 1 is preferably easy to open if there is a need for intravenous access. Basic resuscitation manoeuvres, such as chest compressions and bag mask ventilation or intubation can be performed without removing the thermal shield, and thus protecting the infant against hypothermia. The closing means 8 may e.g. be pressure sensitive fasteners or a snap-lock/opening system, such as Velcro. Other means, such as zips or press buttons are however also covered by the scope of the present invention.

The first opening 6, may also be provided with closing means 8, e.g. in the form of straps, to ensure that the shield stays in place around the head region especially when the second opening 2 is fully opened.

FIG. 3 shows schematically an alternative embodiment of the invention in which the thermal shield 1 can be opened to a blanket- or sheet-like configuration as shown in FIG. 3a; FIG. 3b shows the shield 1 in a fully closed condition. With this embodiment it may be easier to place the infant in the shield 1, but on the other hand it may be more difficult to subsequently gain access to the infant with only limited opening of the closing means 8.

As shown in FIG. 4, the thermal shield 1 may comprise one or more further openings 9 through which physical interaction with the infant is possible without the need to open the second opening 2. Such further openings 9 may e.g. be used for monitoring electrodes, intravenous cannulae, tubes and catheters (not shown). These further openings 9 are typically provided with the same type of closing means 8 as the second opening 2. The positions and shapes shown in the figure are for illustrative purposes only. Any shape and suitable positions, including on the back side, are possible within the scope of the invention.

In some embodiments of the invention, the thermal shield 1 comprises a plurality of air containing pockets 5 between the first and second layers 3,4; similar to what is known e.g. from duvets. The dividing lines between the pockets are shown schematically in FIG. 5a. Hereby a more evenly distribution of the thermally insulating air around the infant can be ensured, and an accidental puncture of one pocket 5 will not render the shield 1 useless. The cross section of such a structure is shown schematically in FIG. 5b. The first and second layers 3,4 may be joined both at the edges and along the joints by thermo welding or any other suitable technique which will be well known to a person skilled in the art. Any suitable shape of the pockets 5 can be used, and the joints are not necessarily linear.

FIG. 6 shows schematically how the mutual arrangement of the first and second layers 3,4 allows establishment of acoustic contact between the skin of an infant 10 and an acoustic transducer 11 placed on an outer surface of the second layer. The part of the infant 10 illustrated in the figure may e.g. be a cross section of an arm. The air pockets 5 must be deformable to an amount necessary to allow for establishment of acoustic contact over a sufficiently large area. The necessary area depends on the size of the outer surface of the transducer used; this may e.g. be an area of at least 1 $cm^2$. In the figure, the upper and lower air pockets 5 (with respect to the figure) were of substantially identical size before being deformed by the transducer 11 being placed thereon.

FIG. 7 shows schematically a thermal shield 1 made from an inner and an outer bag corresponding to the first and second layers 3,4, respectively. FIG. 7.a and FIG. 7.b are cross sectional views along lines A and B, respectively, in FIG. 2. At the cross section in FIG. 7.b, there are open passages 13 from the surroundings and into the air pocket 5 between the first and second layers 3,4. When in use, the first layer 3 clings around the infant 10 while the second layer 4 deforms to a lesser extent than the first layer 3 so that air from the surroundings flows into the air pocket 5 via the open passage 13. FIG. 7.a shows a cross section where the first and second layers 3,4 are joined, such as by laser welding. The figures are not drawn to scale. Any other appropriate joining method may be used; such methods will be well-known to a person skilled in the art. The open passages 13 may be located at any desired position, and there may preferably be a plurality of passages 13. The passage(s) 13 can e.g. be along the joining of the layers 3,4 as shown in FIG. 7.b, but it can also be provided by one or more openings at other locations in one or both of the first and second layers 3,4. The actual positions, shapes and sizes of the passages 13 can e.g. be determined by experimentation.

Each layer 3,4 may be made from two or more sheets of material each. An example of such an embodiment is shown schematically in FIG. 8. The example in FIG. 8 corresponds to the embodiment in FIG. 7.a.

In embodiments comprising one or more open passages 13, it may be possible to actively blow or pump additional air into the at least one air pocket 5 if desired. This could e.g. be desired if the thermal shield 1 unexpectedly does not inflate by the desired amount by passive inflow of air.

In some embodiments of the invention, the thermal shield 1 is provided with one or more non-invasive temperature monitoring device(s) 12 for monitoring the temperature. FIG. 9 shows schematically three possible arrangements of a temperature monitoring device 12. The three different devices 12 are shown on the same shield 1 for illustrative purposes only. In preferred embodiments, only one type of device will be used, but it is possible to use a plurality of devices in the same shield, these devices being either identical or different. The devices 12 shown as a and b are arranged on an inner surface of the first layer 3, i.e. inside the cavity formed by the thermal shield 1. The device shown as a has a small sensor 13 which may be fastened to the skin of the infant for larger precision if considered necessary. The device 12 shown as c is arranged between the first and second layers 3,4 where they are joined. Hereby the temperature monitoring device 12 can be protected by the layers without any significant error in the measurements.

The temperature monitoring device 12 may have preset alarm limits so that the personnel surveying the infant is warned if the temperature drops or rises to undesired levels. The temperature monitoring device 12 may e.g. have a visual colour indicator (not shown) adapted to visually indicate if the temperature is below or above the preset alarm limits.

Figure 10A:
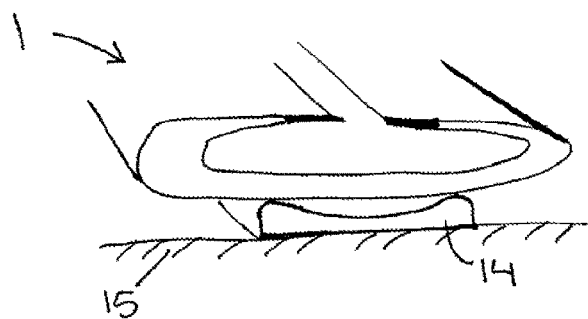
Figure 10B:
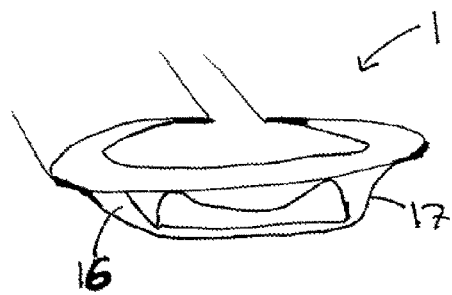

A thermal shield 1 according to the present invention may comprise additional insulation means 14 arranged so that they are located between the infant and a support 15, such as a table, on which the infant is placed when the thermal shield 1 is in use. FIG. 10 shows schematically such an embodiment of the invention where the additional insulation means 14 is in the form of a cushion. Such a cushion may be arranged in place during manufacturing of the thermal shield 1. A compact packing can still be obtained e.g. if the cushion is made from a foam material, such as a polymer foam. Alternatively, it may be adapted to be arranged in the desired position just before use of the thermal shield or when the infant has been placed in the shield. In both cases, the additional insulation means 14 may e.g. be arranged in a separate pocket 16 located on the outer surface of the thermal shield 1, e.g. in the form of an additional layer of material 17 as shown in FIG. 10.b. The placement of the cushion inside the thermal shield 1 before it is packed in a compact way may assist in the unfolding of the thermal shield 1 when the package is opened. Hereby the thermal shield 1 is ready to provide thermal insulation within a few seconds.

A thermal shield 1 according to the invention can be manufactured in different sizes matching different sizes of infants. By ensuring a good match between the size of the infant and the shield 1, it is easier to handle the infant, and less air will be present around the infant, whereby it is easier to keep it warm.

The thermal shield 1 is typically made for one-time usage by disposable materials. It is preferably made fully from materials which can be sterilised, though it may not be necessary, and it may be delivered in a packaging of a size which can easily be fitted into a pocket.

Although the present invention has been described in connection with the specified embodiments, it should not be construed as being in any way limited to the presented examples.

In the above description as well as the claims, only two layers of material are mentioned. However, this does not exclude the possibility of having the shield consisting fully or partly of more than two layers if desired.

The scope of the present invention is set out by the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A thermal shield for at least partly surrounding a newborn infant comprising a first layer and a second layer both of a transparent plastic material that are joined so that there is at least one pocket between the layers, and the mutual arrangement of the first and second layers allows, when the thermal shield is in use, the at least one pocket to be deformable to an amount necessary for establishment of acoustic contact between the infant's skin and an acoustic transducer placed on an outer surface of the thermal shield, wherein there is at least one open passage from the surroundings and into each of the at least one pocket between the first and second layers, and the compliance of the first layer is higher than the compliance of the second layer so that when an infant is placed in the thermal shield with the pocket that is substantially free of air and/or with the first layer and second layer substantially in contact, the first layer clings around the infant while the second layer deforms to a lesser extent than the first layer so that air from the surroundings flows into the at least one pocket via the open passage, wherein the higher compliance of the first layer is achieved by having at least one of a thinner transparent plastic material than the second layer, a more elastic transparent plastic material than the second layer, or a combination thereof.

2. The thermal shield according to claim 1, further comprising:

a first opening for the infant's head, and a second opening with closing means adapted to vary the size of the second opening so that the second opening has a size which allows the infant to be placed in a cavity partly surrounded by the shield when the closing means are in an open condition, and so that the shield surrounds most of the infant when the closing means are in a closed condition.

3. The thermal shield according to claim 1, further comprising one or more further openings through which physical interaction with the infant is possible.

4. The thermal shield according to claim 1, further comprising a non-invasive temperature monitoring device for monitoring the temperature inside the shield when in use.

5. The thermal shield according to claim 4, wherein the temperature monitoring device has preset alarm limits.

6. The thermal shield according to claim 5, wherein the temperature monitoring device has a visual colour indicator adapted to indicate if the temperature is below or above the preset alarm limits.

7. The thermal shield according to claim 1, further comprising a transcutaneous saturation monitor.

8. The thermal shield according to claim 1, further comprising additional insulation means arranged so that they are located between the infant and a support on which the infant is placed when the thermal shield is in use.

9. The thermal shield according to claim 8, wherein the insulation means comprises a cushion made from a polymer foam.

10. The thermal shield according to claim 1, wherein the first layer forms an inner bag adapted to receive the infant inside it, and the second layer forms an outer bag that at least partly surrounds the inner bag.

11. The thermal shield according to claim 10, wherein the outer bag is larger than the inner bag.

12. The thermal shield according to claim 1, wherein the transparent plastic material is impermeable to water vapour at least from the inside to the outside.

\* \* \* \* \*